Sept. 20, 1949.　　　F. A. SATTLER　　　2,482,515
POLYESTER AMIDE RESIN SOLUTION
CONTAINING MIXED SOLVENTS
Filed Dec. 7, 1946
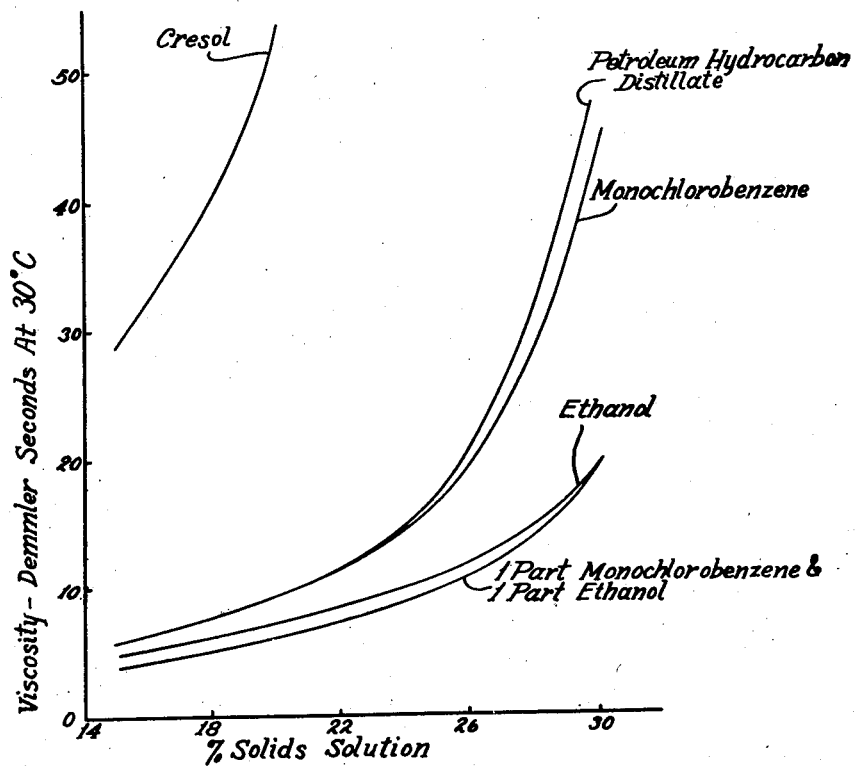
WITNESSES:
Edward Michaels
Mrs. L. Groome
INVENTOR
Frank A. Sattler.
BY
Frederick Shapoe
ATTORNEY Patented Sept. 20, 1949

2,482,515

UNITED STATES PATENT OFFICE 2,482,515

POLYESTER AMIDE RESIN SOLUTION CONTAINING MIXED SOLVENTS

Frank A. Sattler, Pittsburgh, Pa., assignor to Westinghouse Electric Corporation, East Pittsburgh, Pa., a corporation of Pennsylvania Application December 7, 1946, Serial No. 714,813

4 Claims. (Cl. 260—33.4)

This invention relates to the preparation of low viscosity wire enamels and similar solutions from polyester-amide resinous reaction products.

In the copending application of Charles B. Leape, entitled "Synthetic wire enamels," Serial No. 657,554, filed March 27, 1946, there are disclosed certain novel polyester-amide resinous reaction products. It has been discovered that in preparing solutions from the polyester-amide resins there disclosed that the viscosity of the solutions prepared by the use of true solvents alone for such resins in unduly high within the range of resin solids content found desirable in wire enameling. High viscosities limit the mode of application of the solutions and introduce operating difficulties.

The object of this invention is to provide a solution of a polyester-amide resinous reaction product and a combination of solvents, such solutions being characterized by a low viscosity for a given resin solids content.

A further object of the invention is to provide a polyester-amide resin solution embodying a mixed solvent which comprises a true solvent for the resin in combination with a non-solvent diluent.

Other objects of the invention will, in part, be obvious and will, in part, appear hereinafter.

For a better understanding of the nature and objects of the invention reference should be had to the following detailed description and drawing in which the single figure is a graph plotting viscosity against percentage of solids in a wire enamel solution employing various solvent compositions.

The polyester-amide resinous reaction products referred to above may be produced by reacting a combination of unsaturated and saturated dicarboxylic acids, polyhydric alcohol and aliphatic diamine. More specifically, preferred resinous products are produced by reacting from 4.25 to 5.9 moles of an unsaturated acidic compound selected from the group consisting of maleic acid, maleic anhydride and fumaric acid, from 4.8 to 2 moles of a mixture of saturated hydrocarbon aliphatic dicarboxylic acids having an average of from 2 to 3½ non-carboxyl carbon atoms per acid molecule selected from the group consisting of saturated dicarboxylic aliphatic acids having from 1 to 12 non-carboxyl carbon atoms, the saturated dibasic aliphatic acids composed of at least 25 mole-percent of succinic acid, the moles of acidic ingredients totaling from 7.2 to 8.8, from 2.1 to 2.65 moles of saturated hydrocarbon primary diamine having an average of from 2 to 3 carbon atoms per molecule, and from 5 to 6.75 moles of a polyhydric paraffinic alcohol, the major proportion of the polyhydric alcohol being glycol, the total moles of hydrocarbon diamine and polyhydric alcohol being substantially equal to or more than the moles of acidic ingredients. Suitable diamines are ethylene diamine and propylene diamine. Suitable polyhydric alcohols are ethylene glycol, propylene glycol, diethylene glycol, hexamethylene glycol, glycerol and pentaerythritol.

The following example is indicative of the preparation of the synthetic polyester-amide resins of this invention:

EXAMPLE I

|  | Moles |
|---|---|
| Maleic anhydride | 5.34 |
| Succinic acid | 1.33 |
| Adipic acid | 1.33 |
| Ethylene glycol | 5.6 |
| Ethylene diamine | 2.4 | were reacted by placing the first four ingredients in a reaction vessel equipped with a thermometer, stirring means, gas inlet tube, an outlet tube for removing water liberted during the reaction, and a dropping funnel. After the four ingredients had been stirred into a uniform mixture, the ethylene diamine was added to the solution slowly from the dropping funnel with rapid stirring. The rate of addition of the ethylene diamine was so adjusted that approximately ten minutes were required to add it to the reaction vessel. An exothermic reaction occurred during the addition of the ethylene diamine which caused the temperature to rise to from 100° C. to 115° C. After the addition of ethylene diamine was completed, the reaction vessel was heated externally so that the temperature rose slowly. At about 130° C., water vapor was given off and was swept out by a flow of nitrogen gas admitted to the interior of the reaction vessel through the gas inlet tube. The heat input was so adjusted that, after approximately two to eight hours, a temperature of 150° C. was reached. Good results are secured if a period of six hours is taken to reach a temperature of 150° C. The rate of rise of temperature was maintained at this rate, or even at a somewhat slower rate, until the reaction product reached a maximum temperature of from 170° C. to 175° C. At this point, the ball and ring temperature of the resinous reaction product was from 45° C. to 90° C. The reaction was then terminated by diluting the resinous reaction product with a solvent, preferably cresol, in an amount sufficient to produce a composition having from 40% to 60% resin solids. The resulting relatively concentrated resin solution was then cooled rapidly to room temperature.

The resinous reaction product has been found to be readily soluble in cresol. The cresol preferably is meta-para-cresol containing at least 50% of meta-cresol, the remainder being para-cresol and some xylene. The boiling point is about 205° C. This material is well known in the trade and is sold as cresol, the composition varying slightly from batch to batch, but within the proportions indicated. The term "cresol" used herein refers to this product.

The cresol solution of the resinous reaction product produced is rather thick and viscous for any given resin concentration and is not suitable for most coating applications. Referring to Fig. 1 of the drawing, the curve designated "cresol" indicates the viscosity of the solutions of the indicated resin solids content produced from the resin of Example I using cresol alone as the solvent. It will be apparent that the viscosity increases abruptly with small decrease in the proportion of cresol solvent and further that the viscosity for a 20% solution is better than 50 seconds Demmler Cup. Conventional enameling towers in which the enamel is applied by flow coating can be operated only with great difficulty if the enamel viscosity is greater than 50 seconds Demmler Cup. In dip coating devices, it is desirable to employ as wire enamels containing about 25% resin solids content, for most purposes in a range of between 20% and 30% resin solids.

For certain purposes solutions of as low as 5% resin solids content are required. In other cases, such as for impregnating purposes, a high resin solids content of up to 40% is desirable. For preparing the latter, a cresol solution of from 50% to 60% resin solids is diluted with a diluent to the 40% concentration.

According to the present invention, it has been discovered that certain diluents may be introduced into the cresol polyester-amide resinous solution, the diluents not being true solvents for the resin, to produce solutions of an unexpectedly low viscosity for a given resin solids content. Thus, a cresol solution of the polyester-amide resinous reaction product has been successfully diluted with one or more of the non-solvent diluents selected from the following group:

*Table I*

Ethanol (95%)
Petroleum hydrocarbon
Monochlorobenzene
Dichloropentane
Xylene
Isopropyl alcohol The petroleum hydrocarbon in Table I is a fractionated petroleum product being the distillate boiling in the range of 130° C. to 185° C. The dichloropentane is a mixture having a boiling point under 200° C.

Referring to the drawing, the curves labeled with the various diluents indicate the viscosity of the given solution produced by reducing a 50% cresol solution of the polyester-amide resinous product to the given solids content with the respective diluents. In the curves the Demmler Cup viscosity values may be converted to poises by dividing by 31. It will be appreciated that all of the curves indicate an unexpected and considerable decrease in viscosity as compared to a similar resin solids solution prepared with cresol alone. Particularly good results have been obtained with ethanol in that the viscosity curve is relatively flat over a wide range of solids content. Xylene produces a curve similar to that secured with the petroleum hydrocarbon. Particularly good results have been secured with mixtures of xylene and ethanol. Mixtures of from 25% to 75% by weight of ethanol, the balance being xylene, have given excellent enamels for use for coating wire from sizes 20 to 40 and finer.

In preparing the solutions of the resinous reaction products to the low viscosity suitable for wire enameling, it has been found desirable to incorporate at least 10% cresol in the diluent in order to facilitate admixing of the diluent with the 40 to 60% cresol solutions. In some cases, as much as 50% of cresol has been admixed with the diluent before the diluent is incorporated in the cresol solution of the resin. The following examples indicate the preparation of various solutions.

EXAMPLE II

47% solids content solution of cresol and the resinous reaction product of Example I is treated by rapidly stirring into it a mixture composed of approximately 3 parts by weight of ethanol and one part by weight of cresol. The resulting solution having a resin solids content of approximately 25% had a viscosity of 10.3 seconds Demmler Cup at 30° C. Coatings made from the enamel on No. 30 wire were smooth. The enamel wire had excellent properties on subjecting it to various standard tests.

EXAMPLE III

A 47% cresol solution of the polyester-amide reaction product was diluted by introducing a mixture containing 1¾ parts by weight of a petroleum hydrocarbon distillate boiling in a range of from 135° C. to 175° C. sold to the trade as Solvesso No. 2, 1¾ parts by weight of ethanol and one part by weight of cresol. At a viscosity of 10.5 seconds Demmler Cup the solids content of the solution was approximately 25%. The enamel solution so prepared was applied to wire in a conventional wire coating machine, the coatings were extremely smooth and free from any observable imperfections or unevenness of coating. After baking, the enameled wire was found to be of extremely high quality as indicated by standard tests applied thereto.

EXAMPLE IV

Monochlorobenzene was added to a 50% cresol solution of the polyester-amide reaction product. At a 25% solids content the viscosity of the solution so produced was found to be 12½ seconds Demmler Cup. The enamel was applied by dipping to No. 30 copper wire. The enameled wire, after baking, was found to be perfectly smooth with extremely high physical properties.

EXAMPLE V

A 47% solids content cresol polyester-amide solution was diluted by adding thereto a mixture composed of one part by weight of monochlorobenzene and one part by weight of ethanol. At a 25% solids content solution the viscosity was 10.3 seconds Demmler Cup. The enamel so produced was found to produce excellent coatings in a conventional dip enameling tower.

Outstanding wire enamels have been secured from polyester-amide solutions diluted to a solids content of from 14% to 30% in which the solvent contains from 40% to 60% by weight of cresol and the balance of the solvent is composed of the organic diluent. In some cases, solutions considerably more dilute than this may be produced. For example, a solution containing only 5% by weight of the polyester-amide resinous reaction product may be applied to laminations of metal as an insulating coating. If a die coating enamel is being prepared, the solids content may be increased to 40%. The proportion of cresol of the total solvent in any solution is preferably from about 40% to 60%, the organic diluent forming the remainder of the solvent.

Other examples of polyester-amide resinous reaction products are set forth in the above-identified patent application of Charles B. Leape. Furthermore, the addition of small amounts, not exceeding 5%, of the weight of the polyester-amide resin, of an alkyd or a phenolic resin may be accomplished using the same solvent composition. The combination of cresol and a diluent has been found to be effective with all of the compositions so prepared.

It will be apparent that while the preparation of a wire enamel has been emphasized in the preceding examples, the low viscosity coating compositions produced may be employed in numerous other coating and impregnating applications. Thus not only bare wire but wire covered with cotton, glass fibers, asbestos or silk may be coated with the enamels of this invention.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. A resin solution comprising in combination from 5 to 60 parts by weight of the polyester-amide resinous reaction product of from 4.25 to 5.9 moles of an unsaturated acidic compound selected from the group consisting of maleic acid, maleic anhydride and fumaric acid, from 4.8 to 2 moles of a mixture of saturated aliphatic hydrocarbon dicarboxylic acids having an average of from 2 to 3½ non-carboxyl carbon atoms per acid molecule selected from the groups consisting of saturated hydrocarbon dicarboxylic aliphatic acids having from 1 to 12 non-carboxyl carbon atoms, the saturated dicarboxylic aliphatic acids composed of at least 25 mole-per cent of succinic acid, the moles of the acidic ingredients totaling between 7.2 to 8.8, from 2.1 to 2.65 moles of a saturated hydrocarbon primary diamine having an average of from 2 to 3 carbon atoms per molecule, and from 5 to 6.75 moles of a saturated polyhydric paraffinic alcohol having no other reactive groups than the hydroxyl groups, the major proportion of the polyhydric alcohol being a glycol, the total moles of hydrocarbon diamine and polyhydric alcohol being substantially equal to at least the moles of the acidic compounds and dicarboxylic acid ingredients, and from 95 to 40 parts by weight of an organic solvent for the reaction product, the organic solvent composed of from 40% to 60% by weight of cresol and the balance an organic diluent selected from the group consisting of ethanol, propanol, xylene, monochlorobenzene, dichloropentane and petroleum hydrocarbon distillates boiling in the range of from 130° C. to 185° C.

2. A resin solution comprising in combination from 5 to 60 parts by weight of the polyester-amide resinous reaction product of from 4.25 to 5.9 moles of an unsaturated acidic compound selected from the group consisting of maleic acid, maleic anhydride and fumaric acid, from 4.8 to 2 moles of a mixture of succinic and adepic acids, the mixture composed of at least 25 mole-per cent of succinic acid, the moles of the acidic ingredients totaling between 7.2 to 8.8, from 2.1 to 2.65 moles of saturated hydrocarbon primary diamine having an average of from 2 to 3 carbon atoms per molecule, and from 5 to 6.75 moles of a saturated polyhydric paraffinic alcohol having no other reactive groups other than hydroxyl groups, the major proportion of the polyhydric alcohol being a glycol, the total moles of hydrocarbon diamine and polyhydric alcohol being substantially equal to at least the moles of the acidic compound and the dicarboxylic acid ingredients, and from 95 to 40 parts by weight of an organic solvent for the reaction product, the organic solvent composed of from 40% to 60% by weight of cresol and the balance an organic diluent composed of equal parts by weight of ethanol and a petroleum hydrocarbon distillate boiling in the range of from 130° C. to 185° C.

3. The method of producing a resin solution of low viscosity from the polyester-amid resinous reaction product of from 4.25 to 5.9 moles of an unsaturated acidic compound selected from the group consisting of maleic acid, maleic anhydride and fumaric acid, from 4.8 to 2 moles of a mixture of succinic and adipic acids, the mixture composed of at least 25 mole-per cent of succinic acid, the moles of the acidic ingredients totaling between 7.2 to 8.8, from 2.1 to 2.65 moles of a saturated hydrocarbon primary diamine having an average of from 2 to 3 carbon atoms per molecule, and from 5 to 6.75 moles of a saturated polyhydric paraffinic alcohol having no other reactive groups than the hydroxyl groups, the major proportion of the polyhydric alcohol being a glycol, the total moles of hydrocarbon diamine and polyhydric alcohol being substantially equal to at least the moles of the acidic compound and the dicarboxylic acid ingredients, comprising dissolving the resinous polyester-amide reaction product in cresol to a concentration of from 40% to 60% and diluting the solution so produced with a solvent composed of (a) not over 90% of an organic diluent selected from the group consisting of ethanol, propanol, xylene, monochlorobenzene, dichloropentane and petroleum hydrocarbon distillates boiling in the range of from 130° C. to 185° C. and (b) at least 10% by weight of cresol.

4. A resin solution comprising in combination from 5 to 60 parts by weight of the polyester-amide resinous reaction product of from 4.25 to 5.9 moles of an unsaturated acidic compound selected from the group consisting of maleic acid, maleic anhydride and fumaric acid, from 4.8 to 2 moles of a mixture of succinic and adipic acids, the mixture composed of at least 25 mole-per cent of succinic acid, the moles of the acidic ingredients totaling between 7.2 to 8.8, from 2.1 to 2.65 moles of saturated hydrocarbon primary diamine having an average of from 2 to 3 carbon atoms per molecule, and from 5 to 6.75 moles of a saturated polyhydric paraffinic alcohol having no other reactive groups than the hydroxyl groups, the major proportion of the polyhydric alcohol being a glycol, the total moles of hydrocarbon diamine and polyhydric alcohol being substantially equal to at least the moles of acidic ingredients, and from 95 to 40 parts by weight of an organic solvent for the reaction product, the organic solvent composed of from 40% to 60% by weight of cresol and the balance a mixture of from 25 to 75 parts ethanol and 75 to 25 parts of xylene.

FRANK A. SATTLER.

REFERENCES CITED

The following references are of record in the file of this patent:

UNITED STATES PATENTS

| Number    | Name           | Date           |
|-----------|----------------|----------------|
| 2,048,778 | Brubaker et al.| July 28, 1936  |
| 2,130,948 | Carothers      | Sept. 20, 1938 |
| 2,282,827 | Rothrock       | May 12, 1942   |
| 2,342,387 | Catlin         | Feb. 22, 1944  |
| 2,424,884 | Cook et al.    | July 29, 1947  |